US011561725B2

(12) United States Patent
Kang et al.

(10) Patent No.: US 11,561,725 B2
(45) Date of Patent: Jan. 24, 2023

(54) SYSTEM AND OPERATING METHOD THEREOF

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/362,289

(22) Filed: Jun. 29, 2021

(65) Prior Publication Data

US 2022/0229585 A1    Jul. 21, 2022

(30) Foreign Application Priority Data

Jan. 20, 2021 (KR) .................. 10-2021-0007846

(51) Int. Cl.
*G06F 3/06* (2006.01)
*G06F 12/0802* (2016.01)

(52) U.S. Cl.
CPC .......... *G06F 3/0656* (2013.01); *G06F 3/0604* (2013.01); *G06F 3/0652* (2013.01); *G06F 3/0659* (2013.01); *G06F 3/0679* (2013.01); *G06F 12/0802* (2013.01); *G06F 2212/72* (2013.01)

(58) Field of Classification Search
CPC .... G06F 3/0656; G06F 3/0604; G06F 3/0652; G06F 3/0659; G06F 3/0679; G06F 12/0802
See application file for complete search history.

(56) References Cited

U.S. PATENT DOCUMENTS

| | | | | |
|---|---|---|---|---|
| 9,037,793 | B1* | 5/2015 | O'Brien, III | G06F 3/0659 |
| | | | | 711/114 |
| 10,346,095 | B2* | 7/2019 | Joshi | G06F 3/0662 |
| 10,891,081 | B1* | 1/2021 | Gray | G06F 3/0673 |
| 2007/0283217 | A1* | 12/2007 | Gorfajn | G06F 11/1008 |
| | | | | 714/E11.034 |
| 2015/0074338 | A1* | 3/2015 | Raviv | G06F 3/0619 |
| | | | | 711/103 |
| 2018/0107614 | A1* | 4/2018 | Hong | G06F 12/063 |
| 2019/0294350 | A1* | 9/2019 | Hahn | G06F 3/0656 |
| 2019/0303299 | A1* | 10/2019 | Su | G06F 3/064 |
| 2020/0264780 | A1* | 8/2020 | Franciosi | G06F 9/5016 |

FOREIGN PATENT DOCUMENTS

| | | |
|---|---|---|
| KR | 10-1790728 B1 | 11/2017 |
| KR | 10-2018-0081236 A | 7/2018 |

* cited by examiner

*Primary Examiner* — Ramon A. Mercado
(74) *Attorney, Agent, or Firm* — IP & T Group LLP

(57) ABSTRACT

Embodiments of the present disclosure relate to a system and an operating method thereof. According to embodiments of the present disclosure, a memory system may transmit a first type response indicating that first data has been cached in a cache to the host when receiving a first command requesting to write the first data from the host, and may transmit a second type response indicating success or failure of an operation of storing the first data in the memory device to the host after transmitting the first type response to the host. Further, the host may delete the first data from a write buffer after the operation of storing the first data in the memory device succeeds.

14 Claims, 13 Drawing Sheets

SYSTEM AND OPERATING METHOD THEREOF

CROSS-REFERENCE TO RELATED APPLICATION

The present application claims priority under 35 U.S.C. 119(a) to Korean patent application number 10-2021-0007846 filed on Jan. 20, 2021, which is incorporated herein by reference in its entirety.

BACKGROUND

1. Technical Field

The embodiments relate to a system and an operating method thereof.

2. Related Art

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

In general, in order to quickly process a write command received from a host, a memory system first stores the data to be written in a cache, and then transmits a response that the write was successful to the host, and then flushes the data stored in the cache to the memory device.

SUMMARY

Embodiments of the disclosure may provide a system capable of reducing a cache size in a memory system and an operating method of the system.

In addition, embodiments of the disclosure may provide a system and an operating method thereof capable of simplifying an operation of handling a failure when a failure occurs during an operation of writing data.

Further, embodiments of the present disclosure may provide a system and an operating method thereof capable of supporting a host to read cached data in a cache before data is written to a memory system.

In one aspect, embodiments of the disclosure may provide a system including a memory system capable of storing data, and a host requesting to write data to the memory system.

The memory system may include a memory device for storing data, and a cache for caching data to be stored in the memory device.

The memory system may transmit a first type response indicating that first data has been cached in the cache to the host when receiving a first command requesting to write the first data from the host.

The memory system may transmit a second type response indicating success or failure of an operation of storing the first data in the memory device to the host after transmitting the first type response to the host.

The host may include a write buffer for storing the first data.

The host may delete the first data from the write buffer after the operation of storing the first data in the memory device succeeds.

In another aspect, embodiments of the disclosure may provide an operating method of a system including a memory system capable of storing data and a host requesting to write data to the memory system.

The operating method of the system may include transmitting, by the host, a first command requesting to write first data to the memory system.

In addition, the operating method of the system may include transmitting, by the memory system, a first type response indicating that the first data has been cached in a cache included in the memory system to the host.

Further, the operating method of the system may include transmitting, by the memory system, a second type response indicating success or failure of an operation of storing the first data in a memory device included in the memory system to the host after transmitting the first type response to the host.

In another aspect, embodiments of the disclosure may provide an operating method of a system including a host and a memory system.

The operating method of the system may include providing, by the host, the memory system with a request together with data while keeping therein the data.

The operating method of the system may include providing, by the memory system, the host with a storage completion response upon success of storing therein the data.

The operating method of the system may include removing, by the host, the kept data in response to the storage completion response.

The operating method of the system may further include providing, by the memory system, the host with a caching completion response upon caching therein the data before the storing of the data. In this case, the cached data may be stored in the memory system.

The operating method of the system may further include repeating, by the host, the providing of the request together with the data upon failure of the storing of the data.

In addition, the operating method of the system may include deleting, by the host, the first data from a write buffer included in the host after the operation of storing the first data in the memory device succeeds.

According to embodiments of the present disclosure, it is possible to reduce the size of the cache inside the memory system, simplify the operation of handling the failures occurring during the data write operation, and support the host to read the cached data in the cache before the data is written to the memory system.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
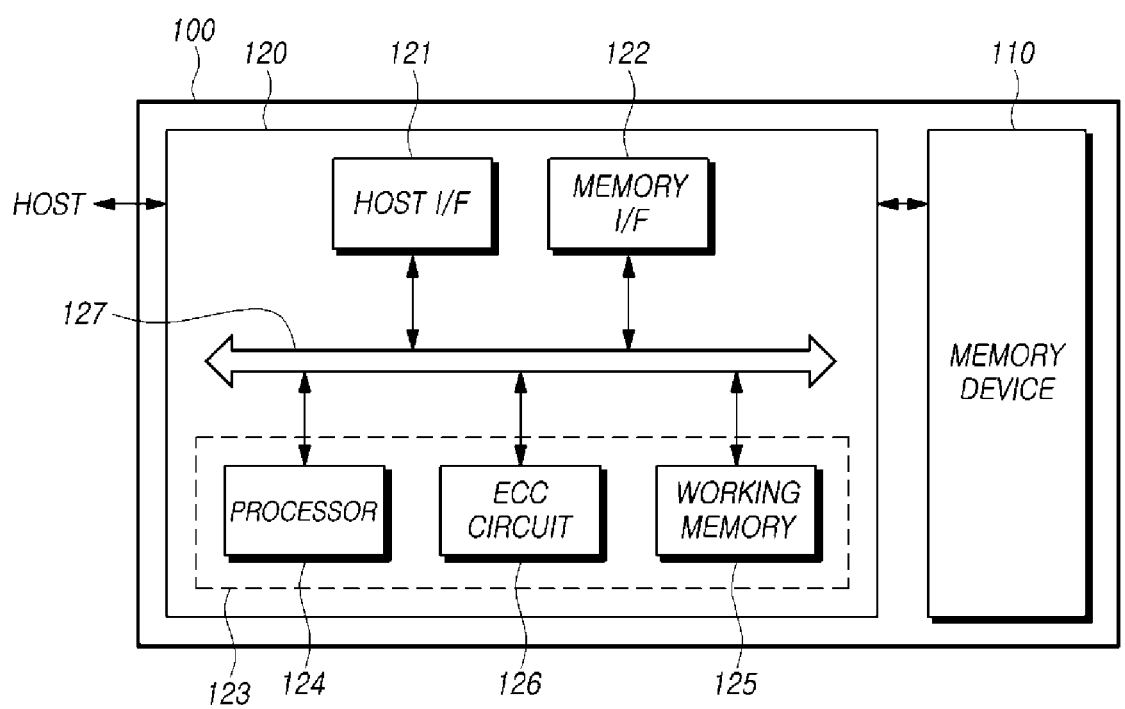
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute instructions, e.g., firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
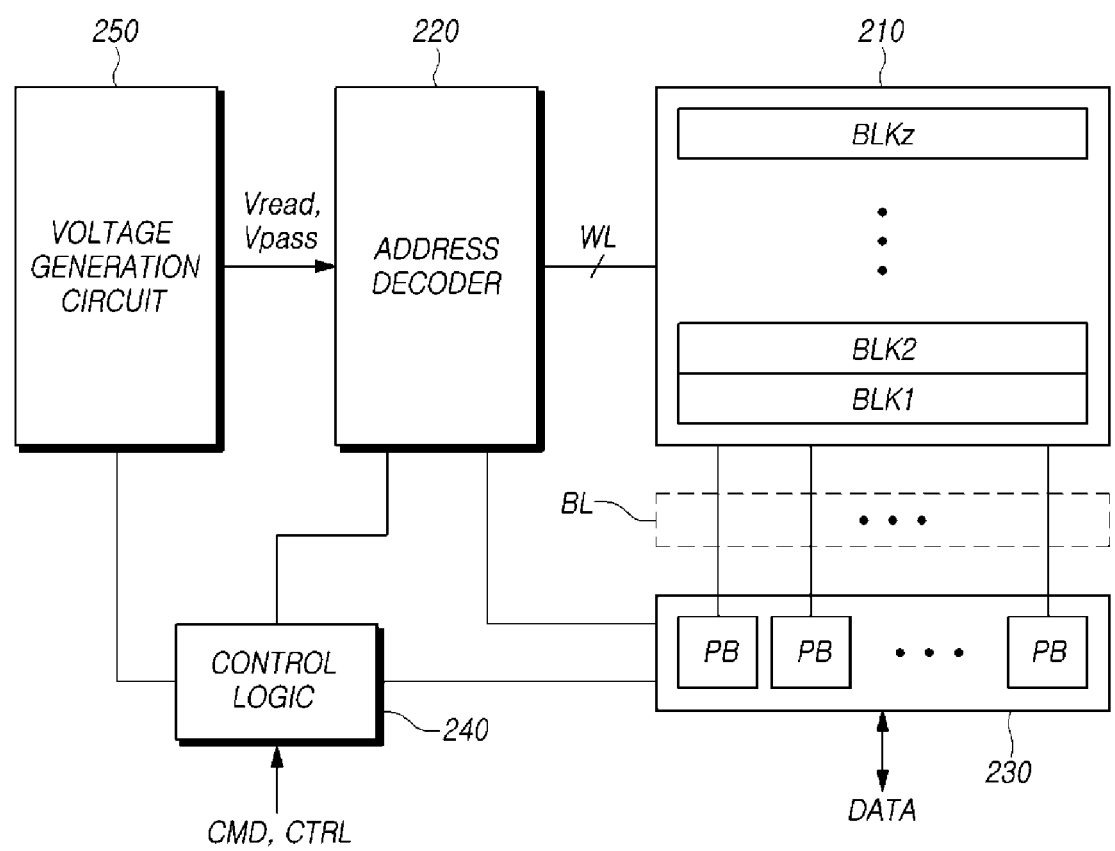
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
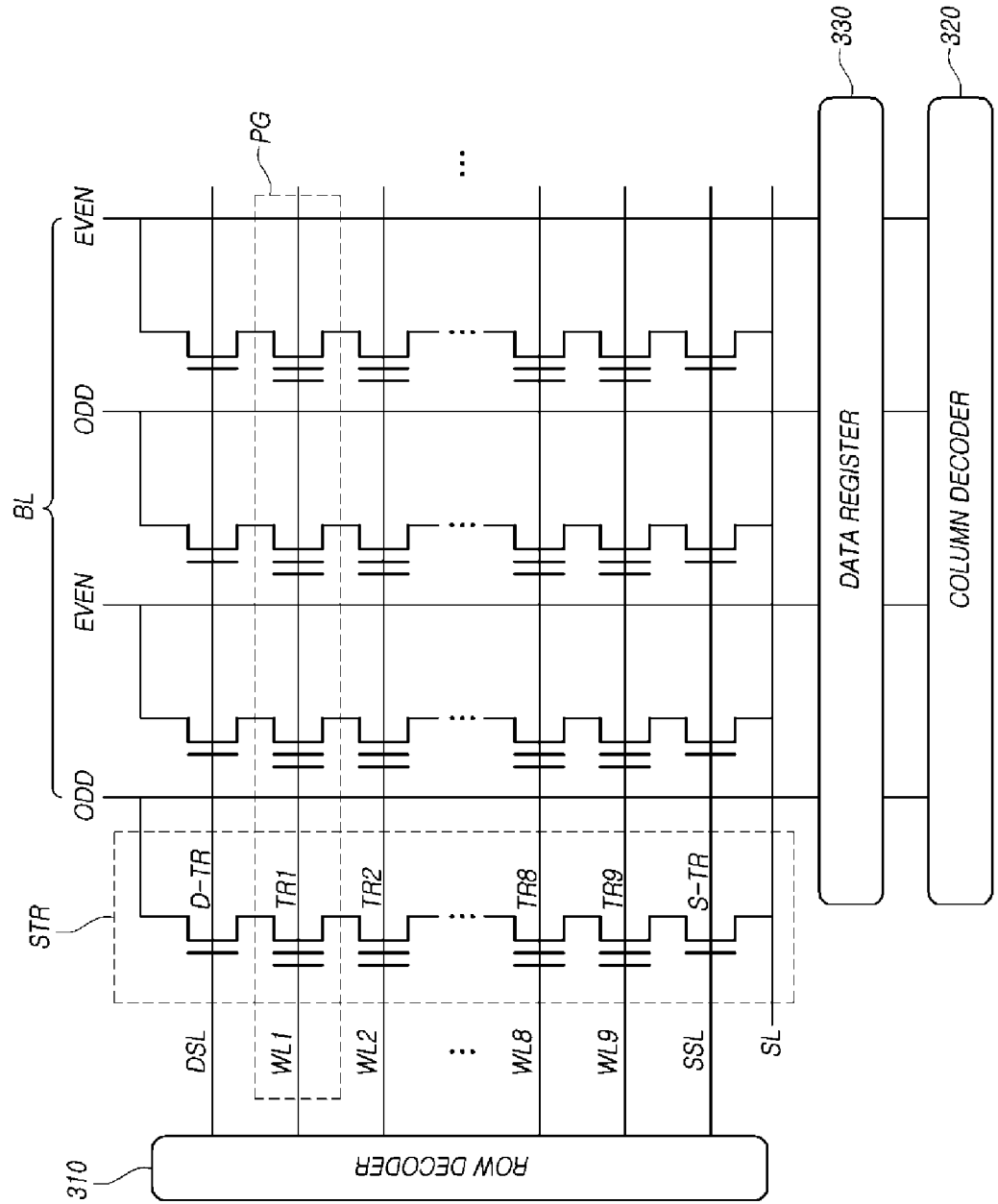
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction may be called "page" PG, and a certain number of memory cells that are coupled in series may be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
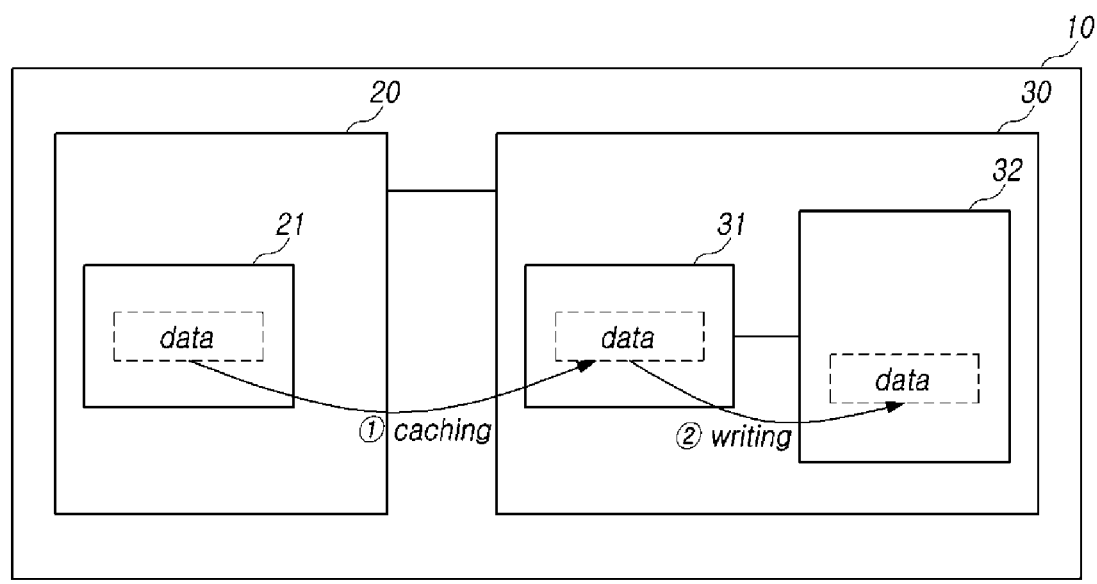
FIG. 4 is a diagram illustrating a schematic structure of a system according to embodiments of the present disclosure.

FIG. 4 is a diagram illustrating a schematic structure of a system 10 according to embodiments of the present disclosure.

Referring to FIG. 4, a system 10 may include a host 20 and a memory system 30.

The host 20 may request the memory system 30 to write data. To this end, the host 20 may transmit a write command and data to be written to the memory system 30.

When receiving the write command from the host, the memory system 30 may store data requested to be written by the write command. In this case, the memory system 30 may be implemented with the memory system 100 described above with reference to FIG. 1.

In FIG. 4, the host 20 may include a write buffer 21. The write buffer 21 is a memory area for temporarily storing data to be written to the memory system 30 and may be implemented as, for example, a volatile memory (e.g. SRAM, DRAM).

In addition, the memory system 30 may include a cache 31 and a memory device 32. The cache 31 is a memory area capable of temporarily storing corresponding data until an operation of storing data in the memory device 32 is completed. The memory device 32 is a memory area capable of storing data. In this case, the cache 31 may be implemented by the working memory 125 described in FIG. 1 or a separate volatile memory, and the memory device 32 may be implemented by the memory device 110 described in FIG. 1.

In FIG. 4, when the host 20 requests the memory system 30 to write data, the memory system 30 may first cache data in the cache 31 before storing the data in the memory device 32 (①).

In addition, the memory system 30 may write the data cached in the cache 31 to the memory device 32 when a specific condition is satisfied (②). For example, the memory system 30 may write data cached in the cache 31 to the memory device 32 when the total size of data cached in the cache 31 is equal to or larger than a set unit size. As another example, the memory system 30 may write the data cached in the cache 31 to the memory device 32 when a predetermined time or more elapses from the time when data was recently written to the memory device 32.

Hereinafter, it will be described an operation of the host 20 and the memory system 30 described above in FIG. 4 through a sequence diagram.

Figure 5:
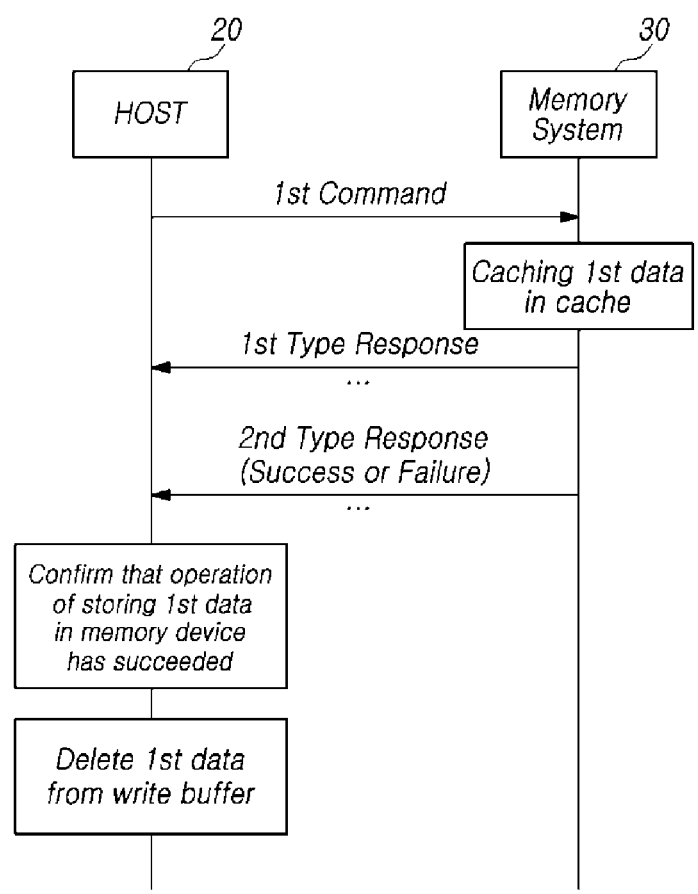
FIG. 5 is a sequence diagram illustrating an example of the operation of a system according to the embodiments of the present disclosure.

FIG. 5 is a sequence diagram illustrating an example of the operation of a system 10 according to the embodiments of the present disclosure.

Referring to FIG. 5, a host 20 may transmit a first command requesting to write the first data to the memory system 30. For example, the first command is provided together with the first data to the memory system 30. In response to the first command, the memory system 30 caches the first data into the cache 31 and then stores the cached first data into the memory device 32.

In this case, the memory system 30 may divide the response to a first command into two different types of responses, a first type response and a second type response, and transmit the response to the host 20.

When receiving the first command from the host 20, the memory system 30 may first cache the first data in the cache 31. When the operation of caching the first data in the cache 31 is completed, the memory system 30 may transmit the first type response indicating that the first data has been cached in the cache 31 to the host 20. At this time, when receiving the first type response, the host 20 may not delete the first data from a write buffer 21 and maintain the state in which the first data is stored in the write buffer 21 or move the first data from the write buffer 21 to another buffer operating at a slower speed than the write buffer 21.

Further, after transmitting the first type response to the host, the memory system 30 may transmit a second type response indicating success or failure of the operation of storing the first data in the memory device 32 to the host 20. The memory system 30 may transmit the second type response to the host 20 only once or may transmit the second type response to the host 20 multiple times depending on the host's request or whether the success or failure of the operation of storing in the memory device 32.

After receiving the first type response from the memory system 30, the host 20 may check information indicating that the operation of storing the first data in the memory device 32 has succeeded. In this case, the host 20 may, for example, check information that the operation of storing the first data in the memory device 32 has succeeded through the above-described second type response.

After checking that the operation of storing the first data in the memory device 32 has succeeded, the host 20 may delete the first data from a write buffer 21. That is, the host 20 may maintain the first data in the write buffer 21 until the time when the operation of storing the first data in the memory device 32 succeeds, not the time when the first data is cached in the cache 31.

The reason why the memory system 30 transmits the response to the first command transmitted from the host 20 by dividing into a first type response and a second type response, and maintains the first data in the write buffer 21 until the operation of storing the first data in the memory device 32 succeeds will be described below If the memory system 30 transmits a response indicating that the operation of writing data to the host 20 has succeeded after caching the data in the cache 31, the memory system 30 ensures that the cached data is normally stored in the memory device 32 without errors. In addition, the memory system 30 ensures that the read operation of reading the cached data is normally executed without errors.

As an example, when receiving a command requesting to write data from the host 20, the memory system 30 may cache the data in the cache 31 and transmit a response indicating that the operation of writing the data to the host 20 has succeeded. Thereafter, the memory system 30 may receive a command requesting to read the data.

In this case, the memory system 30 transmits the data requested by the host 20 even when writing the data cached in the cache 31 to the memory device 32 fails. This is because the memory system 30 has already transmitted a response indicating that the operation of writing data to the host 20 has succeeded.

Therefore, the memory system 30, before processing the s data read request from the host 20, removes mapping information corresponding to the changed LBA from L2P (logical-to-physical) map and execute an operation of rewriting the data cached in the cache 31 to the memory device 32 to transmit the data for the data read request from the host 20. In addition, in order to first execute an operation of rewriting the data cached in the cache 31 to the memory device 32 than the data read request, the memory system 30 should first dequeue a command instructing the data read request from a command queue.

Due to this, the timing at which the memory system 30 processes the data read request from the host 20 may be delayed.

In addition, in order to perform the above-described operation, the memory system 30 maintains the data in the cache 31 until the data is normally stored in the memory device 32 without errors. Accordingly, the time for maintaining the cached state of data in the cache 31 increases, and the size of the cache 31 is increased in order to maintain the cached state of the data in the cache 31 for a long time. As a result, there is a problem that the cost required to implement the cache 31 of the memory system 30 increases.

Accordingly, the memory system can reduce the size of the cache 31 by maintaining the data in the write buffer 21 by the host 20 instead of maintaining the cached state of the data in the cache 31 until data is normally stored in the memory device 32 without error.

In this case, even if the memory system 30 deletes data from the cache 31 before the data is normally stored in the memory device 32, the host 20 may execute a recovery operation using the data stored in the write buffer 21 by rewriting the data to the memory system 30. Accordingly, the memory system 30 can reduce the size of the cache 31 and the cost required to implement the cache 31 of the memory system 30 may be reduced. In this case, the state in which data is stored in the write buffer 21 is maintained for a long time, however, in general, since the size of the write buffer 21 is much larger than the size of the cache 31 and the size of the free space is also large, the additional cost required to implement the write buffer 21 is less than the reduction in cost required to implement the cache 31.

However, to this end, the host 20 determines a state of the memory system 30, that is, whether data has been cached in the cache 31 and whether data has been normally written to the memory device 32 after being cached. To this end, the memory system 30 may transmit a first type response and a second type response to the host 20, so that the host 20 may perform an operation to normally write data to the memory system 30 based on the first type response and the second type response.

As an example, when receiving a command requesting to write data from the host 20, the memory system 30 may transmit information indicating that an operation of writing data has failed after caching the data in the cache 31 to the host 20 through the second type response.

Thereafter, even if the memory system 30 receives a command, which is transmitted by the host 20 before the host 20 has received information that the operation of writing data to the memory system 30 has failed, requesting to read the data stored in the address where the data is written from the host 20, there is no need to transmit the data requested to be written by the host 20. This is because the host 20 has received information that the operation of writing data to the memory system 30 has failed.

Accordingly, the memory system 30 is not required to first dequeue a command instructing a data read request from the command queue in the process of removing the LBA changed in the process of failing to write the data cached in the cache 31 to the memory device 32. Therefore, it is possible to simplify an operation of handling a failure in the case that an operation of writing data by the memory system 30 fails.

Figure 6:
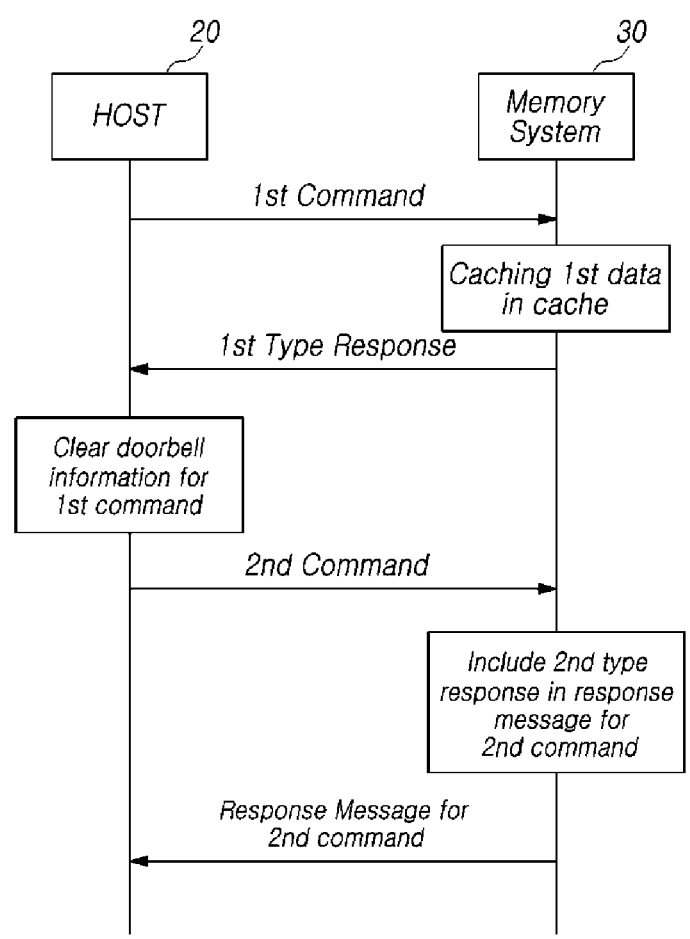
FIG. 6 is a sequence diagram illustrating an example in which a memory system transmits a second type response to a host according to embodiments of the present disclosure.

FIG. 6 is a sequence diagram illustrating an example in which a memory system 30 transmits a second type response to a host 20 according to embodiments of the present disclosure.

Referring to FIG. 6, the memory system 30 may receive a first command requesting to write the first data from the host 20, cache the first data in a cache 31, and then transmit a first type response to the host 20.

The host 20 may clear doorbell information for the first command after receiving the first type response from the memory system 30. The doorbell information for the first command is information indicating whether processing for the first command has been completed, and the host 20 cannot transmit another command to the memory system 30 before the doorbell information for the first command is cleared, and may transmit another command to the memory system 30 after the doorbell information for the first command is cleared. In this case, since the host 20 can immediately transmit another command to the memory system 30 after receiving the first type response from the memory system 30, there may not occur the problem of delaying processing of other commands due to the first command. In this case, clearing doorbell information means that initializing doorbell information to reset state.

The host 20 may transmit a second command to the memory system 30 after clearing the doorbell information for the first command. In this case, the second command is a command different from the first command and is not necessarily a write command. For example, the second command may be a read command.

In this case, the memory system 30 may transmit a response message for the second command by including a second type response indicating success or failure of an operation of storing the first data in the memory device 32 in the response message. This is because the doorbell information for the first command has already been cleared, so that the memory system 30 cannot independently transmit the response message for the first command to the host 20.

In this case, in order to indicate that the second type response included in the response message for the second command is a response for the first command, the memory system 30 may include tag information corresponding to the first command together in a response message to the second command.

After receiving the response message for the second command from the memory system 30, the host 20 may check whether the operation of storing the first data in the memory device 32 succeeds or fails by checking the second type response in the response message for the second command.

Meanwhile, when the host 20 receives the second type response from the memory system 30, operations of the host 20 and the memory system 30 may be different depending on whether the second type response indicates the operation of storing the first data in the memory device 32 has succeeded or failed.

Hereinafter, it will be described a sequence in the case that the host 20 receives a second type response indicating that the operation of storing the first data in the memory device 32 has failed from the memory system 30.

Figure 7:
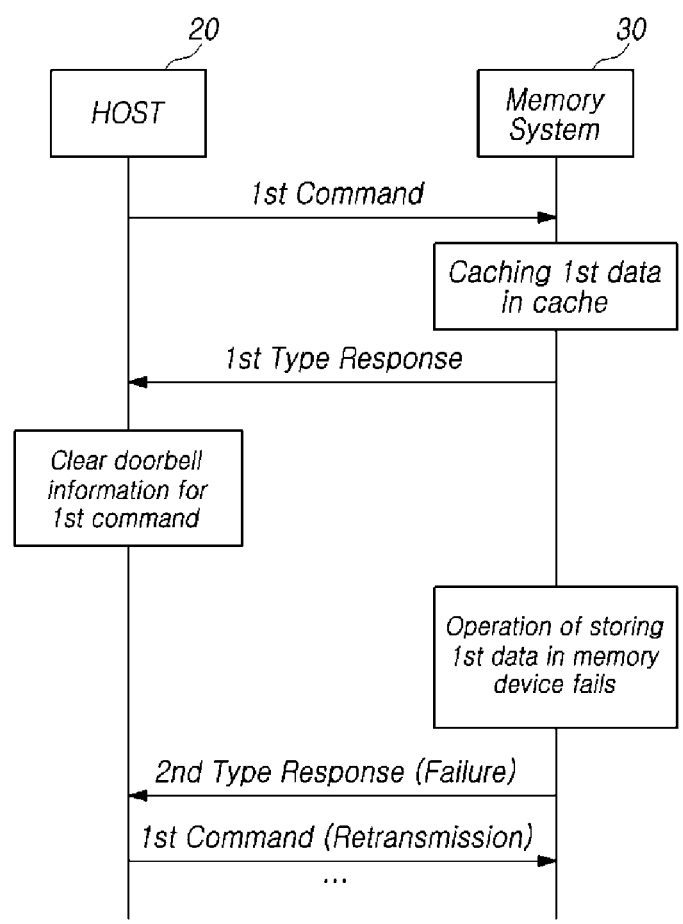
FIGS. 7 to 8 are sequence diagrams illustrating a case in which a memory system according to embodiments of the present disclosure fails an operation of storing first data in a memory device.
Figure 8:
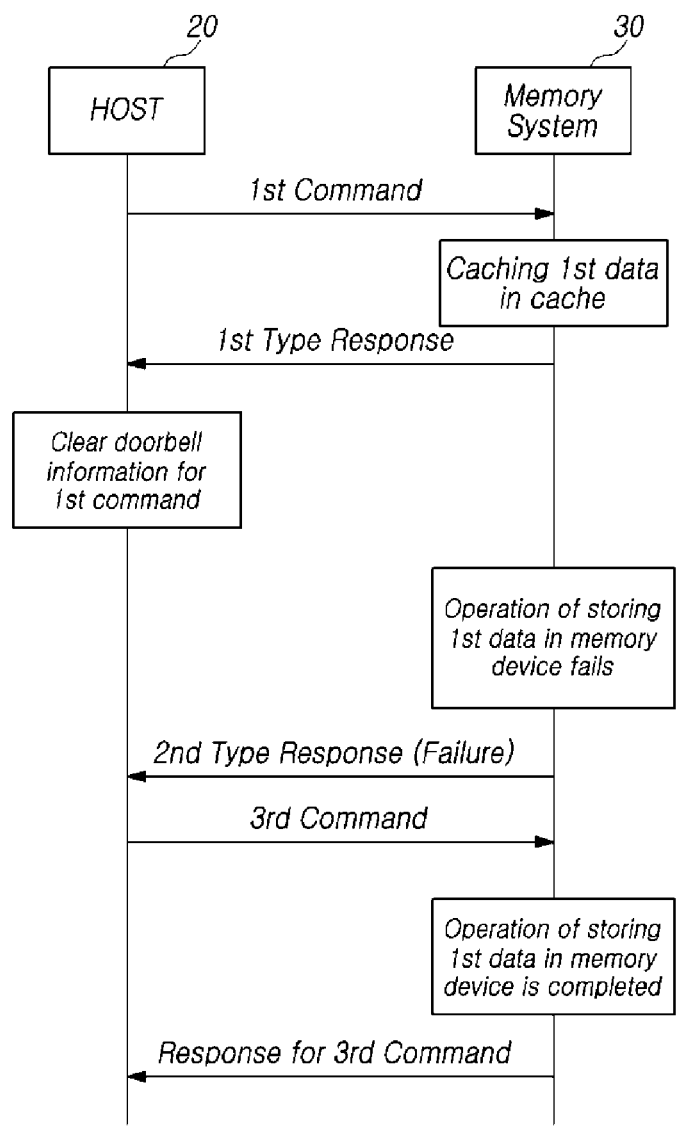

FIGS. 7 to 8 are sequence diagrams illustrating a case in which a memory system 30 according to embodiments of the present disclosure fails an operation of storing first data in a memory device.

As an example, in FIG. 7, the memory system 30 may receive a first command requesting to write first data from the host 20, cache the first data in the cache 31, and transmit a first type response to the host 20. In addition, the host 20 may clear doorbell information for the first command.

Thereafter, in the case that the memory system 30 fails to store the first data cached in the cache 31 in the memory device 32, the memory system 30 may transmit a second type response indicating that the operation of storing the first data in the memory device has failed to the host 20.

After receiving the second type response and confirming that it has failed to store the first data in the memory device 32, the host 20 may retransmit the first command to the memory system 30. In this case, since the doorbell information for the first command has been cleared and the first data has not yet been deleted from the write buffer 21, the host 20 may retransmit the first command to the memory system 30. Meanwhile, the host 20 may set the doorbell information for the first command again when retransmitting the first command to the memory system 30.

In this case, the operation of the host 20 retransmitting the first command to the memory system 30 may be executed repeatedly until the memory system 30 transmits a second type response indicating that the operation of storing the first data in the memory device has succeeded to the host 20.

As another example of FIG. 8, like FIG. 7, the memory system 30 may receive a first command requesting to write first data from a host 20, cache the first data in the cache 31, and transmit a first type response to the host 20. In addition, the host 20 may clear doorbell information for the first command.

Thereafter, in the case that the memory system 30 fails to store the first data cached in the cache 31 in the memory device 32, the memory system 30 may transmit a second type response indicating that the operation of storing the first data in the memory device has failed to the host 20.

After receiving the second type response and confirming that the first data has failed to be stored in the memory device 32, the host 20 may transmit a new third command to the memory system 30 instead of retransmitting the first command to the memory system 30. In this case, since doorbell information for the first command has already been cleared, the host 20 may transmit the third command to the memory system 30. If the host 20 may transmit the third command to the memory system 30, the first data which is cached in the cache 31 may be deleted.

The third command is a command instructing the memory system 30 to respond at the time when the operation of storing the first data in the memory device 32 is completed, not the time when the first data is cached in the cache 31. As an example, the third command may be a write buffer command for the first data. As another example, the third command may be a write command of a force unit access (FUA) attribute instructing to immediately write the first data to the memory device 32. In this case, since the first data has not yet been deleted from the write buffer 21, the third command may instruct to write the first data.

Figure 9:
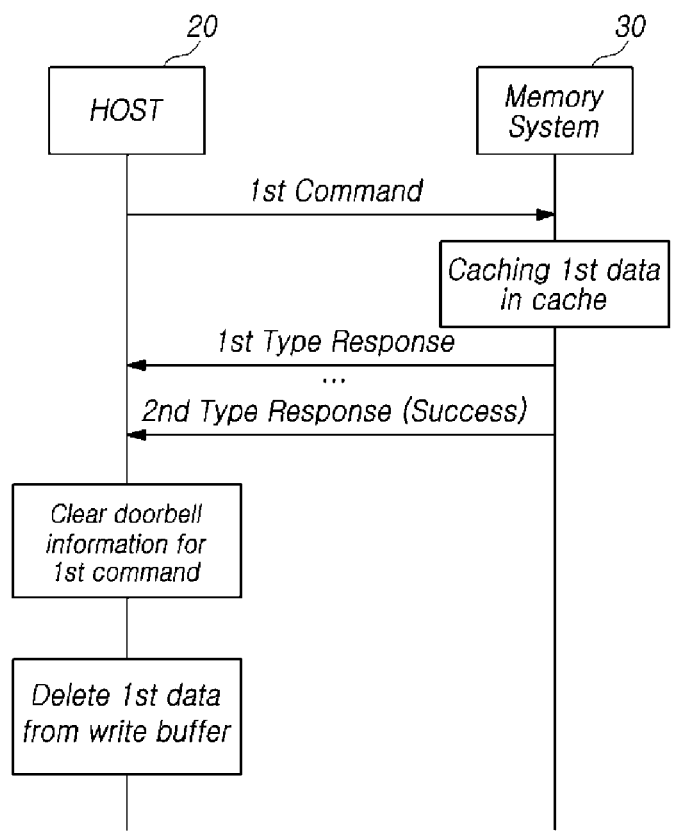
FIG. 9 is a sequence diagram illustrating an example of an operation performed by a host after receiving a second type response according to embodiments of the present disclosure.

FIG. 9 is a sequence diagram illustrating an example of an operation performed by a host 20 after receiving a second type response according to embodiments of the present disclosure.

Referring to FIG. 9, the memory system 30 may receive a first command requesting to write first data from the host 20, cache the first data in the cache 31, and then transmit a first type response to the host 20.

Thereafter, in the case that the memory system 30 succeeds in storing the first data cached in the cache 31 in the memory device 32, the memory system 30 may transmit a second type response indicating that the operation of storing the first data in the memory device 32 has succeeded to the host 20.

In this case, the host 20 may clear doorbell information for the first command and delete the first data from the write buffer 21 after receiving the second type response indicating that the operation of storing the first data in the memory device has succeeded from the memory system 30.

Figure 10:
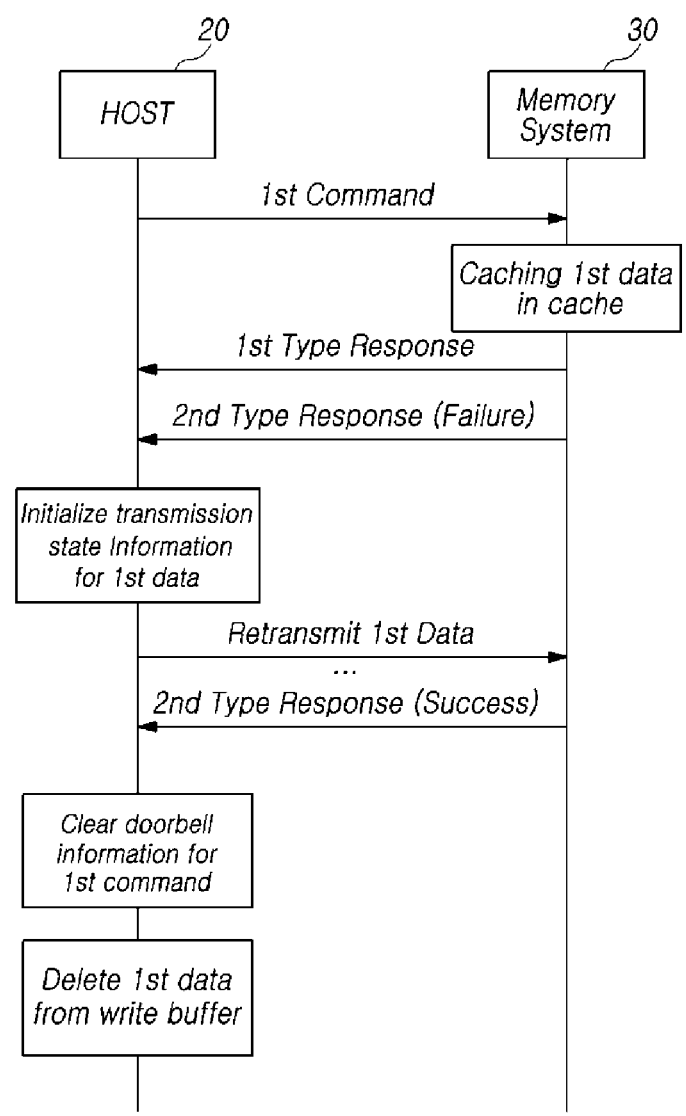
FIG. 10 is a sequence diagram illustrating another example of an operation performed by a host after receiving a second type response according to embodiments of the present disclosure.

FIG. 10 is a sequence diagram illustrating another example of an operation performed by a host 20 after receiving a second type response according to embodiments of the present disclosure.

Referring to FIG. 10, the memory system 30 may receive a first command requesting to write the first data from the host 20, cache the first data in the cache 31, and then transmit a first type response to the host 20.

Thereafter, in the case that the memory system 30 fails to store the first data cached in the cache 31 in the memory device 32, the memory system 30 may transmit a second type response indicating that the operation of storing the first data in the memory device 32 has failed to the host 20.

In this case, the host 20 may retransmit the entire first data to the memory system 30 without clearing the doorbell information for the first command. At this time, since the doorbell information for the first command has not yet been cleared, the host 20 cannot retransmit the first command to the memory system 30 or transmit another command to the memory system 30.

In order to retransmit the first data to the memory system 30, the host 20 may initialize transmission state information, which is exchanged between the host 20 and the memory system 30 for checking a transmission state of the first data. In order to initialize the transmission state information, the host 20 may directly initialize the transmission state information or instruct the memory system 30 to initialize the transmission state information.

As an example, in order to retransmit the entire first data to the memory system 30, the host 20 may initialize a value of ready-to-transfer (RTT) information transmitted from the memory system 30 to the host 20 and a value of data out information transmitted from the host 20 to the memory system 30.

The ready-to-transfer information indicates the size of data that the memory system 30 can receive from the host 20. In addition, the host 20 may transmit data to be written to the memory system 30 to the memory system 30 through data output information based on the ready-to-transfer information. Accordingly, the host 20 may retransmit the first data to the memory system 30 from the beginning by initializing the ready-to-transfer information and the data output information.

When the host 20 performs an operation of retransmitting the first data to the memory system 30 and then receives a second type response indicating that the operation of storing the first data in the memory device has succeeded, the host 20 may clear doorbell information for the first command and delete the first data from the write buffer 21. In this case, the memory system 30 knows that the first data retransmitted is matched to the first command because the value of RTT information and data out information was initialized. Because the value of RTT information and data out information was initialized, the host 20 should retransmit the first data to the memory system 30 to complete the first command.

Figure 11:
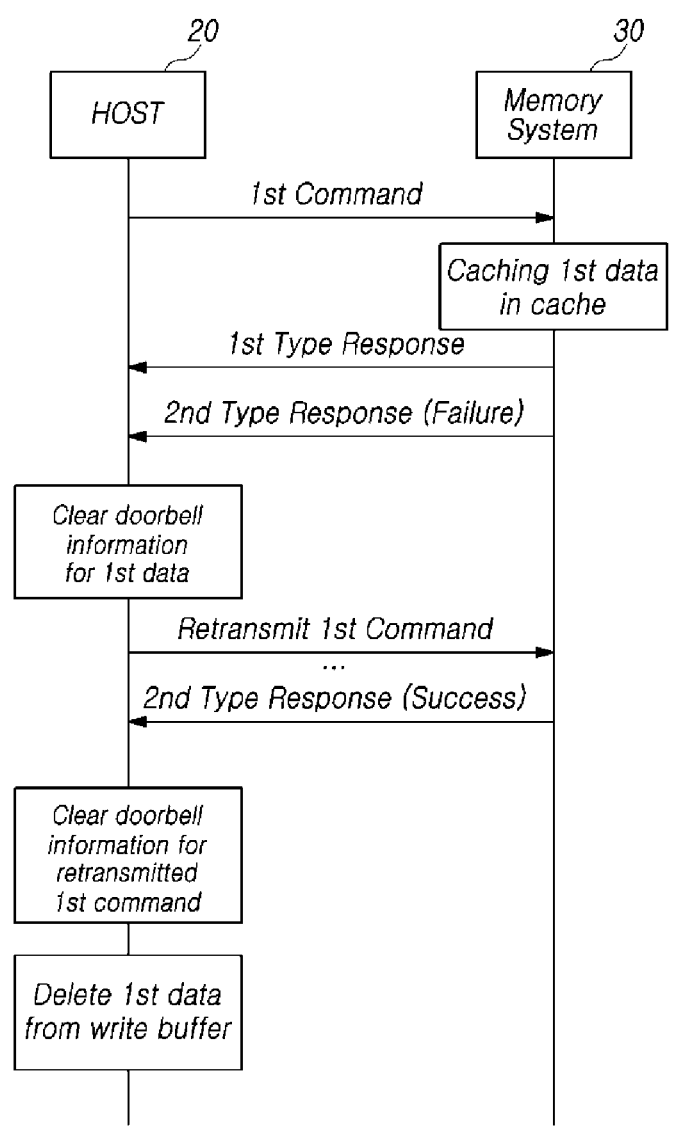
FIG. 11 is a sequence diagram illustrating another example of an operation performed by a host after receiving a second type response according to embodiments of the present disclosure.

FIG. 11 is a sequence diagram illustrating another example of an operation performed by a host 20 after receiving a second type response according to embodiments of the present disclosure.

Referring to FIG. 11, the memory system 30 may receive a first command requesting to write the first data from the host 20, cache the first data in the cache 31, and then transmit a first type response to the host 20.

Thereafter, in the case that the memory system 30 fails to store the first data cached in the cache 31 in the memory device 32, the memory system 30 may transmit a second type response indicating that the operation of storing the first data in the memory device 32 has failed to the host 20.

In this case, the host 20 may clear the doorbell information for the first command and retransmit the first command to the memory system 30. Since the doorbell for the first command has been cleared and the first data is held in the write buffer 21, the host 20 may retransmit the first command to the memory system 30. Meanwhile, the host 20 may set doorbell information for the first command again when retransmitting the first command to the memory system 30.

After the host 20 performs an operation of retransmitting the first command to the memory system 30 and receives a second type response (a first type response is already received) indicating that the operation of storing the first data in the memory device has succeeded, the host may clear doorbell information for the retransmitted first command and delete the first data from the write buffer 21. In this case, the first data retransmitted may be cached in the cache 31 or written to the memory device 32 directly. When the first data retransmitted is cached in the cached 31, original first data which was cached in the cached 31 may be removed.

Figure 12:
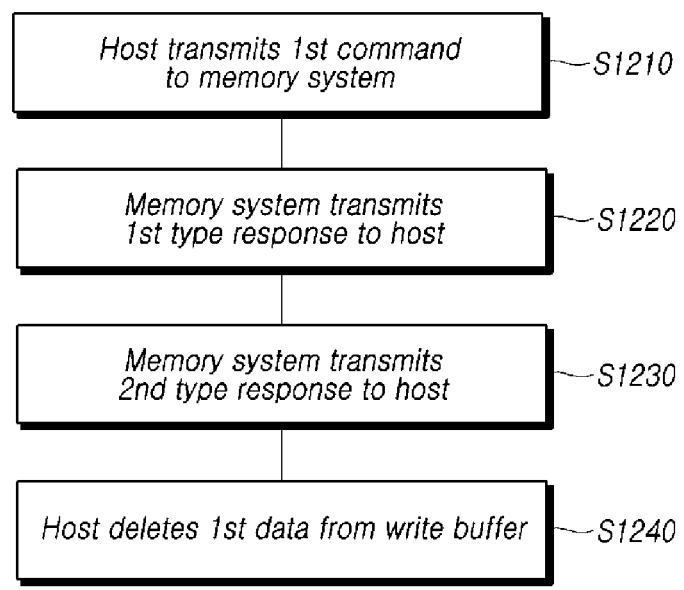
FIG. 12 is a diagram illustrating an operating method of a system according to embodiments of the present disclosure.

FIG. 12 is a diagram illustrating an operating method of a system 10 according to embodiments of the present disclosure.

Referring to FIG. 12, the operating method of the system 10 may include transmitting a first command by a host 20 to a memory system 30 (S1210). In this case, the first command is a command requesting to write first data.

In addition, the operating method of the system 10 may include transmitting a first type response by the memory system 30 to the host 20 (S1220). In this case, the first type response indicates that the first data has been cached in a cache 31 of the memory system 30.

Further, the operating method of the system 10 may include transmitting a second type response by the memory system 30 to the host 20 after the memory system 30 transmits the first type response to the host 20 (S1230). In this case, the second type response indicates whether the operation of storing the first data in the memory device 32 of the memory system 30 has succeeded or failed.

Further, the operating method of the system 10 may include deleting the first data from the write buffer 21 of the host 20 by the host 20 after the operation of storing the first data in the memory device 32 of the memory system 30 succeeds (S1240).

As an example, doorbell information corresponding to the first command may be cleared when the host 20 receives the first type response, and the second type response may be transmitted to the host 20 through a response message to the second command received by the memory system 30 from the host 20.

In this case, as an example, the operating method of the system 10 may further include retransmitting, by the host 20, the first command to the memory system 30 when the host 20 receives the second type response indicating that the operation of storing the first data in the memory device 32 has failed. As another example, the operating method of the system 10 may further include transmitting by the host 20, when the host 20 receives the second type response indicating that the operation of storing the first data in the memory device 32 has failed, a third command instructing to respond after the operation of storing the first data in the memory device is completed to the memory system 30.

As another example, doorbell information corresponding to the first command may be cleared when the host 20 receives the second type response indicating that the operation of storing the first data in the memory device 32 has succeeded.

In this case, the operating method of the system 10 may further include retransmitting, by the host 20, all of the first data to the memory system 30 when the host 20 receives the second type response indicating that the operation of storing the first data in the memory device has failed.

As another example, the operating method of the system 10 may further include the step in which, when the host 20 receives the second type response indicating that the operation of storing the first data in the memory device 32 has failed, the host 20 clears doorbell information corresponding to the first command and retransmits the first command to the memory system 30.

Figure 13:
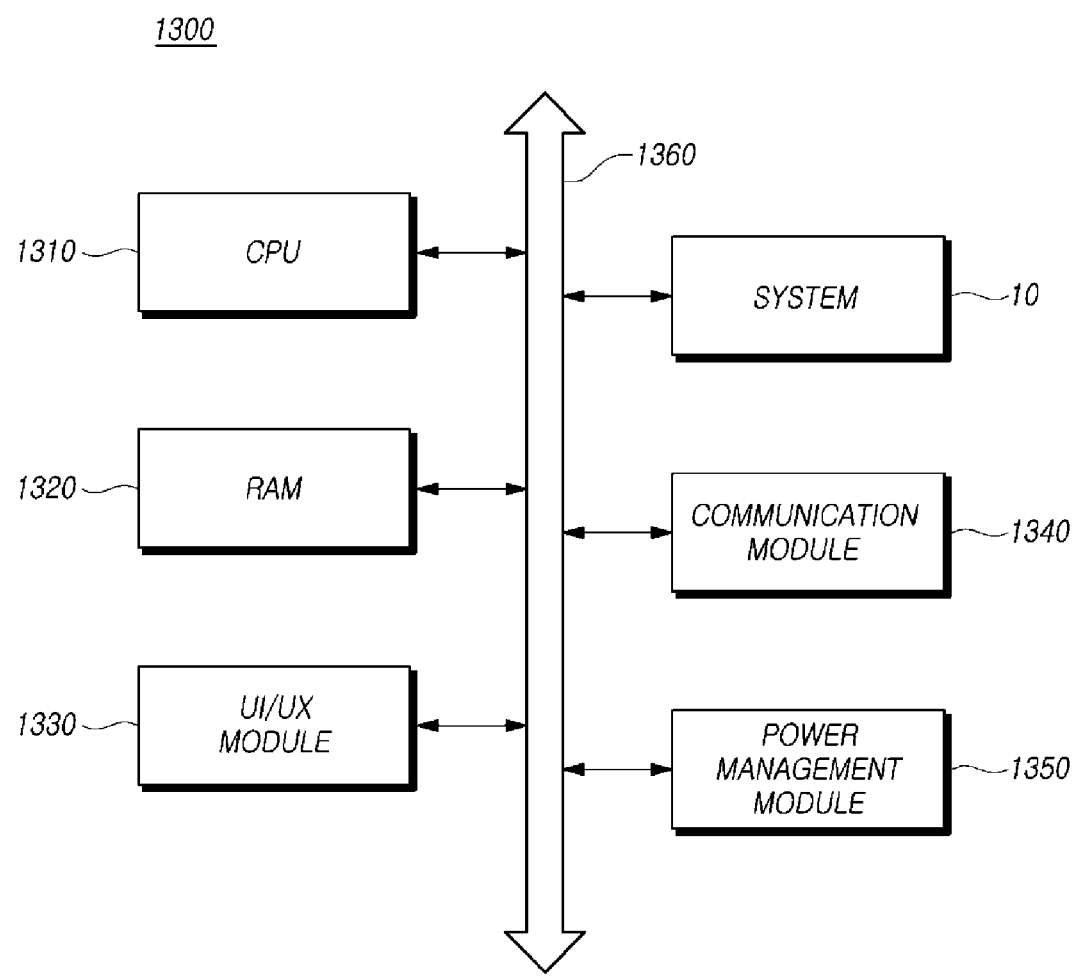
FIG. 13 is a diagram illustrating the configuration of a computing system based on some embodiments of the disclosed technology.

FIG. 13 is a diagram illustrating the configuration of a computing system 1300 based on an embodiment of the disclosed technology.

Referring to FIG. 13, the computing system 1300 based on an embodiment of the disclosed technology may include: a system 10 electrically connected to a system bus 1360; a CPU 1310 configured to control the overall operation of the computing system 1300; a RAM 1320 configured to store data and information related to operations of the computing system 1300; a user interface/user experience (UI/UX) module 1330 configured to provide the user with a user environment; a communication module 1340 configured to communicate with an external device as a wired and/or wireless type; and a power management module 1350 configured to manage power used by the computing system 1300.

The computing system 1300 may be a personal computer (PC) or may include a mobile terminal such as a smartphone, a tablet or various electronic devices.

The computing system 1300 may further include a battery for supplying an operating voltage, and may further include an application chipset, a graphic-related module, a camera image processor, and a DRAM. Other elements would be obvious to a person skilled in the art.

The system 10 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the system 10 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this patent document.

What is claimed is:

1. A system comprising:
a memory system capable of storing data; and
a host requesting to write data to the memory system,
wherein the memory system includes a memory device for storing data and a cache for caching data to be stored in the memory device,
wherein the memory system further transmits a first type response indicating that first data has been cached in the cache to the host when receiving a first command requesting to write the first data from the host, and further transmits a second type response indicating success or failure of an operation of storing the first data in the memory device to the host after transmitting the first type response to the host,
wherein the host includes a write buffer for storing the first data,
wherein the host further deletes the first data from the write buffer after the operation of storing the first data in the memory device succeeds, and
wherein the host further clears doorbell information corresponding to the first command when receiving the first type response.

2. The system of claim 1,
wherein the memory system transmits the second type response to the host through a response message for a second command received from the host.

3. The system of claim 2, wherein the host further retransmits the first command to the memory system when receiving the second type response indicating the failure of the operation of storing the first data in the memory device.

4. The system of claim 2, wherein the host further transmits, when receiving the second type response indicating the failure of the operation of storing the first data in the memory device, a third command instructing to respond after the operation of storing the first data in the memory device is completed to the memory system.

5. The system of claim 1, wherein the host further clears doorbell information corresponding to the first command when receiving the second type response indicating the success of the operation of storing the first data in the memory device.

6. The system of claim 5, wherein the host further retransmits all of the first data to the memory system when receiving the second type response indicating the failure of the operation of storing the first data in the memory device.

7. The system of claim 1, wherein the host further clears doorbell information corresponding to the first command and further retransmits the first command to the memory system, when receiving the second type response indicating the failure of the operation of storing the first data in the memory device.

8. An operating method of a system including a memory system capable of storing data and a host requesting to write data to the memory system, the operating method comprising:
transmitting, by the host, a first command requesting to write first data to the memory system;
transmitting, by the memory system, a first type response indicating that the first data has been cached in a cache included in the memory system to the host;
transmitting, by the memory system, a second type response indicating success or failure of an operation of storing the first data in a memory device included in the memory system to the host after transmitting the first type response to the host;
deleting, by the host, the first data from a write buffer included in the host after the operation of storing the first data in the memory device succeeds; and
clearing, by the host, doorbell information corresponding to the first command when the host receives the first type response.

9. The operating method of claim 8,
wherein the second type response is transmitted to the host through a response message to a second command received by the memory system from the host.

10. The operating method of claim 9, further comprising retransmitting, by the host, the first command to the memory system when the host receives the second type response indicating the failure of the operation of storing the first data in the memory device.

11. The operating method of claim 9, further comprising transmitting by the host, when the host receives the second type response indicating the failure of the operation of storing the first data in the memory device, a third command instructing to respond after the operation of storing the first data in the memory device is completed to the memory system.

12. The operating method of claim 8, further comprising clearing, by the host, doorbell information corresponding to the first command when the host receives the second type response indicating the success of the operation of storing the first data in the memory device.

13. The operating method of claim 12, further comprising retransmitting, by the host, all of the first data to the memory system when the host receives the second type response indicating the failure of the operation of storing the first data in the memory device.

14. The operating method of claim 8, further comprising, when the host receives the second type response indicating the failure of the operation of storing the first data in the memory device:
clearing, by the host, doorbell information corresponding to the first command; and
retransmitting, by the host, the first command to the memory system.

* * * * *